United States Patent Office 3,808,307
Patented Apr. 30, 1974

3,808,307
PREPARATION OF BERYLLIUM HYDRIDE FROM A TERTIARY AMINE COMPLEX OF BERYLLIUM HYDRIDE
Lawrence H. Shepherd, Jr., Baton Rouge, La., and Gary Ter Haar, Western Springs, Ill., assignors to Ethyl Corporation, Richmond, Va.
No Drawing. Original application June 5, 1967, Ser. No. 645,559. Divided and this application Nov. 22, 1968, Ser. No. 797,717
Int. Cl. C01b 6/00; C01f 3/00
U.S. Cl. 423—134                 2 Claims

ABSTRACT OF THE DISCLOSURE

Novel complexes of beryllium hydride with tertiary amines, containing one molecule of beryllium hydride for each tertiary amino nitrogen atom in the amine and useful as metal plating and reducing agents, are prepared (1) by reaction of dialkylberyllium with dialkylaluminum hydride and treatment of the intermediate product with a lower trialkyl amine, (2) from beryllium hydride and a tertiary amine under elevated pressure and (3) from beryllium hydride and a tertiary amine in a ball or rod mill at ambient temperature and pressure. Utilization of these processes for the preparation of pure beryllium hydride and the purification of crude beryllium hydride is disclosed.

---

This is a division of my prior copending application Ser. No. 645,559, filed June 5, 1967.

This invention relates to and has as its principal objects the provision of novel amine complexes of beryllium hydride, the provision of novel methods for the preparation of these complexes and the use thereof in processes for the purification of beryllium hydride.

In accordance with this invention, new compositions of matter have been discovered which comprise molecular complexes of beryllium hydride with tertiary amines, where in the molar ratio of beryllium hydride to amine is 1:1 for monoamines and $n:1$ for polyamines containing $n$ tertiary amino nitrogen atoms, and wherein the amine components include trimethylamine, dimethylethylamine, methyldiethylamine, triethylamine, amines of the formula

wherein Me represents a methyl radical and R a straight chain alkyl radical containing from three to about twelve carbon atoms, N,N-dimethylbenzyl-amine, N,N-dimethyl-cyclohexyl amine, N-methyl pyrrolidine, N-ethyl pyrrolidine, N-methyl piperidine, N-methyl morpholine, tetramethylethylenediamine, triethylenediamine, and tripropylenediamine. These novel compounds represent important embodiments of this invention.

A number of distinct and independent processes have been discovered for the preparation of these novel compounds. One such process comprises reacting a dialkyl beryllium with a dialkyl aluminum hydride to produce beryllium bis(trialkylaluminum monohydride) of the formula

wherein R represents alkyl, reacting this intermediate product with an approximately stoichiometric proportion of a trialkylamine to produce a reaction product containing beryllium hydride trialkylamine and trialkylaluminum trialkylamine, and separating the beryllium hydride trialkylamine from the reaction product. This process, which will be referred to hereinafter as the aluminum process, constitutes an embodiment of the present invention.

A preferred embodiment of this invention comprises the above aluminum process, wherein the dialkyl beryllium is diethyl beryllium, the dialkylaluminum hydride is diethylaluminum hydride, the trialkylamine is trimethylamine and the reactions are carried out at ambient temperature.

Another embodiment of this invention comprises preparing the novel amine complexes disclosed above by reacting beryllium hydride with an excess of the corresponding amine at a temperature of from about 0° C. to about 180° C. under the autogenous pressure of the amine to produce a reaction product containing the desired molecular complex and excess amine, and separating the complex from the reaction mixture. This process will be referred to hereinafter as the high pressure process.

A further embodiment of this invention is the process for the preparation of the amine complexes disclosed above, which comprises reacting beryllium hydride with an excess of the corresponding amine at ambient temperature and pressure in a ball or rod mill and under an atmosphere inert with respect to both reactants and products to produce a reaction product containing the desired molecular complex and excess amine, and separating the molecular complex from the reaction mixture. This method of preparation will be referred to hereinafter as the ball-mill process. This process is well adapted to the preparation of amine derivatives which are weak Lewis bases or which contain highly branched chains or other groups causing steric hindrance and which thus lead to products of reduced thermal stability.

Another embodiment of this invention is the preparation of beryllium hydride of a high degree of purity by heating, in an atmosphere inert with respect to reactants and products and to a temperature sufficient to effect substantially complete dissociation thereof, one or more of the amine complexes disclosed above to produce a reaction product containing beryllium hydride and the amine, and separating the beryllium hydride from the reaction product.

Still another embodiment of the present invention is a process for the purification of crude beryllium hydride which comprises treating the crude hydride by one of the processes disclosed above to produce a beryllium hydride-amine molecular complex, purifying the complex by a known procedure such as recrystallization from an appropriate solvent, dissociating the purified complex as described above to produce a reaction mixture containing beryllium hydride and the free amine, and separating the beryllium hydride from the reaction mixture.

Other embodiments will appear hereinafter.

The processes of the present invention exhibit a number of significant advantages over previously published methods for the preparation of beryllium hydride. Thus the amine complexes of this invention represent the only known soluble form of beryllium hydride which can readily be dissociated to yield the free hydride. The present processes can therefore be used to prepare pure beryllium hydride from the impure products of previously published methods of preparation or from reject material. This can be accomplished by converting the impure beryllium hydride to an amine complex by one of the methods herein disclosed, purifying the complex by crystallization, sublimation or other suitable method, and dissociating the complex thermally to beryllium hydride by the process of this invention.

The invention will be more fully understood by reference to the following set of illustrative examples in which, unless otherwise specified, all parts and percentages are by weight.

EXAMPLE 1

Beryllium hydride trimethylamine by high pressure process

A Monel metal bomb was fitted with a valve, the screw treads of which were sealed with strip Teflon (polytetrafluoroethylene). One part of beryllium hydride was placed in the bomb, after which the valve was attached and tightened. About 54 parts of trimethylamine were condensed into the bomb, which was then sealed, placed in an oil bath at 140° C. and rotated continuously at that temperature for ten days.

The bomb was removed from the oil bath, cooled with liquid nitrogen to −196° C. and opened under vacuum. Only a trace of non-condensible gas (hydrogen) was found to have been liberated. The excess trimethylamine was pumped out at −60° C. The bomb was then opened under an atmosphere of dry nitrogen, and 5.9 parts of solid product were obtained.

Analysis of the solid product for active hydrogen gave a value of 3.04 percent by weight (theory for beryllium hydride trimethylamine: 2.86). An X-ray pattern indicated that the product was largely crystalline. Crystals removed manually from the solid product gave an active hydrogen value of 2.80, indicating a high degree of purity.

An experiment similar to the above, except that 3.3 parts of beryllium hydride were used, the temperature of reaction was 135° C. and the reaction time four days, gave a 93 percent yield of a product having an active hydrogen content of 2.87 percent by weight corresponding, within the limits of analytical error, to a purity of 100 percent.

EXAMPLE 2

Beryllium hydride N-methyl pyrrolidine

Using the method of Example 1, 2.82 parts of beryllium hydride were heated with 131 parts (400 percent excess) of N-methyl pyrrolidine for four days at 145–150° C. A 75-percent yield of product was obtained which evolved, upon acid treatment, 20.5 millimoles of hydrogen per gram (theory for the 1:1 molecular complex: 20.8).

The product had a melting point of 86.0 to 86.5° C. Its molecular weight in benzene (by freezing point depression) was 192, corresponding to the dimer.

When the N-methyl pyrrolidine of Example 2 was replaced by N-ethyl pyrrolidine, N-methyl piperidine, dimethyl-n-dodecyl amine and dimethyl-n-octyl amine, the corresponding molecular complexes were obtained.

When the N-methyl pyrrolidine of Example 2 was replaced by N,N,N',N' - tetramethylethylenediamine, similar results were obtained, but the product was polymeric in nature.

EXAMPLE 3

Beryllium hydride N,N-dimethylbenzyl amine

Using the method of Example 1, 1.33 parts of beryllium hydride were heated with 16 parts (approximate stoichiometric equivalent) of N,N-dimethylbenzyl amine for five days at 130–160° C.

Since the product adhered to the wall of the bomb, it was extracted with 80 parts of hot N,N-dimethylbenzyl amine. The extract was filtered hot and cooled to ambient temperature, whereupon 7.21 parts of product separated out.

The product had a melting point of 101–103° C. Upon acid treatment, it evolved 13.01 millimoles of hydrogen per gram (theory for the 1:1 molecular complex is 13.7).

EXAMPLE 4

Beryllium hydride trimethylamine by aluminum process

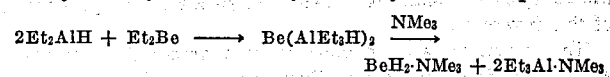

$$2Et_2AlH + Et_2Be \longrightarrow Be(AlEt_3H)_2 \xrightarrow{NMe_3} BeH_2 \cdot NMe_3 + 2Et_3Al \cdot NMe_3$$

Into a flask were introduced, under nitrogen, 10.4 grams of 95 percent diethylaluminum monohydride. Freshly distilled diethylberyllium (3.85 grams) was added, and the components were mixed thoroughly.

A reactor was prepared consisting of a flask provided with a magnetic stirring bar, a nitrogen inlet and a reflux condenser. The condenser was cooled by means of a Dry Ice-acetone mixture, and 40 milliliters of trimethylamine, previously purified by distillation from lithium aluminum hydride, were condensed into the reactor.

A portion (12.56 grams) of the above diethylaluminum monohydride-diethylberyllium mixture was added slowly, with vigorous stirring, to the trimethylamine in the reactor. The flow of coolant in the condenser was interrupted, and the reaction mixture was stirred for 16 hours at room temperature to remove excess trimethylamine. A solid residue formed which was separated by filtration, washed with pentane, vacuum dried for 15 minutes and analyzed.

| | Analysis (weight percent) | |
|---|---|---|
| | Found | Theory for $BeH_2 \cdot NMe_3$ |
| Aluminum | 0.03 | 0 |
| Beryllium hydride | 15.1 | 15.9 |
| Trimethylamine | 80.3 | 84.4 |

X-ray diffraction analysis of the product showed it to be identical to the product obtained in Example I.

EXAMPLE 5

Beryllium hydride triethylamine by ball-mill process

The reactor was a 1-liter ball mill one-third full of half-inch balls.

To the reactor were added (1) 217 parts (a 200 percent excess) of triethylamine and (2) 7.7 parts of beryllium hydride (95 percent pure). The reactor was set in rotation, and the milling continued for five days at room temperature. The contents of the reactor were then heated to 45° C. and filtered. The filtrate, upon refrigeration, deposited 10 parts of solids, identified by chemical analysis as beryllium hydride triethylamine.

When the process of Example 5 is repeated, using N-methyl pyrrolidine instead of triethylamine, similar results are obtained.

EXAMPLE 6

Beryllium hydride N-methyl morpholine

Using the method of Example 5, 20 parts of beryllium hydride and 68 parts of N-methyl morpholine were milled together at room temperature for two days. The product was dissolved in benzene and the mixture was filtered. The benzene and excess N-methyl morpholine were removed under vacuum, and 12.24 parts of product were isolated and analyzed.

| | Analysis | |
|---|---|---|
| | Found | Theory for N-methyl morpholine $\cdot BeH_2$ |
| Millimoles H− per gram | 17.31 | 17.85 |
| Millimoles Be per gram | 10.05 | 8.93 |
| Millimoles amine per gram | 8.87 | 8.93 |

EXAMPLE 7

Pyrolysis of beryllium hydride trimethylamine

About 70 parts of sublimed beryllium hydride trimethylamine and 5 parts of crystalline beryllium hydride were ground together and placed in a heavy-walled U-tube. After evacuation, the tube was sealed off. All the solid was collected in one leg by tapping. This leg was inserted in a heated oil bath and the other leg in a Dewar flask. The solid was slowly heated to 120° C. and held overnight at that temperature. The cold leg was then cooled to 0° C. for three hours while the temperature in the hot leg was raised to 160° C. Finally, the cold leg was cooled slowly to −196° C. and the hot leg heated to 180° C. These conditions were maintained overnight.

The hot leg was then sealed off and cooled, and the contents were analyzed.

*Analysis.*—Active hydrogen (percent): Found, 17.1; Theory for BeH$_2$, 18.3; Purity of beryllium hydride, 93.5.

EXAMPLE 8

Pyrolysis of beryllium hydride N-methyl pyrrolidine

A weighed sample of beryllium hydride N-methyl pyrrolidine was placed under high vacuum and heated slowly to its melting point. The temperature was then raised to 210° C. over a period of about three hours and held at that value for an additional three hours. After cooling, the residue was analyzed.

*Analysis.*—Active hydrogen (percent): Found, 16.1; Theory for BeH$_2$, 18.3; Purity of BeH$_2$, 88.0.

When beryllium hydride N-methyl morpholine and beryllium hydride triethylamine were pyrolyzed by the method of Example 8, similar results were obtained.

For sake of clarity, the reaction conditions will be discussed separately for the three synthetic reactions and for the pyrolysis reaction.

Aluminum process

Since the alkyl groups contained in the aluminum and beryllium reactants do not appear in the final product, their choice is in no way critical. Thus, each alkyl group can contain from 1 to about 8 or more carbon atoms. However, the amine reactants must be tertiary amines and are limited to the very low members of the aliphatic series. In the reaction between the alkyl aluminum hydride and the beryllium alkyl, an excess of the former (this can range from 1 to a 100 percent or greater excess) is desirable to assure that the intermediate contains hydrogen at least equivalent to the beryllium. In the reaction between the intermediate complex and the amine, the proportions can vary from a 100 percent or greater excess of the intermediate complex to a 100 percent or greater excess of the amine. But a considerable excess, say from 10 up to about 50 percent, of the amine is preferred, both because it is the cheaper of the reactants and because the excess amine can serve as reaction solvent.

The reaction temperature is limited by the volatility of the amine reactant. Temperatures from −40° C. to 60° C. or above are satisfactory but room temperature is conveniently maintained and is therefore preferred. Temperatures below −40° C. are of limited utility because of the low reaction rate, solubility and fluidity under such conditions.

Pressure is not a critical factor in the reaction. Pressures below atmospheric introduce problems because of the volatility of the amine but pressures from 1 to 100 atmospheres or more can be used if suitable equipment is provided. Atmospheric pressure is generally preferred because of the associated ease of manipulation and economy of equipment but, in the cases of some of the more volatile amines, such as trimethylamine, pressures in excess of atmospheric are useful for the purpose of maintaining the amines in the liquid phase.

The reactions were uniformly carried out under a protective atmosphere of dry nitrogen, but any atmosphere inert with respect to reactants and product can be used. For example, helium, neon, argon, krypton, xenon and saturated aliphatic hydrocarbons constitute satisfactory inert atmospheres.

High pressure process

Here again the stoichiometry is not critical but an excess of the tertiary amine is desired for the reasons and in the amounts suggested above in connection with the aluminum process. Furthermore, the order of addition of the reactants is unimportant; either reactant can be added to the other with satisfactory results. The reaction temperature can range from about 0° to 180° C. or above. Temperatures in the range of 130–150° C. are preferred because of the convenience and controllability of the reaction rate at these temperatures. The pressure is the autogenous pressure of the amine at the reaction temperature.

A considerable variety of amine reactants can be employed in the high-pressure process. These include, in addition to those mentioned above, N,N-dimethylethyl amine;
N-methyldiethyl amine;
N,N-dimethylisobutyl amine;
N,N-dimethyl-n-hexyl amine;
N,N-dimethyl-n-decyl amine;
N,N-dimethylcyclohexyl amine;
N,N-dimethyl-4-ethylcyclohexyl amine;
N,N-dimethyl-3,5-dimethylcyclohexyl amine;
N,N-dimethyl-3,5-diethylcyclohexyl amine;
N,N-dimethyl-4-ethylbenzyl amine;
N,N-dimethyl-3-isobutylbenzyl amine;
N,N-dimethyl-4-tert-butylbenzyl amine;
N,N-dimethyl-3-n-octylbenzyl amine;
N,N-dimethyl-4-n-dodecylbenzyl amine;
N,N,N′,N′-tetramethylpropylene diamine;
N,N,N′,N′-tetramethylbutylene diamine;
triethylenediamine and
tripropylenediamine.

Ball mill process

The reaction components are the same as in the high pressure process and the remarks under that process concerning reactant proportions are valid here also. The reaction temperature can vary from 0° C. or below to the boiling point of the amine under the pressure employed, always provided that the temperature does not exceed about 200° C., the decomposition temperature of beryllium hydride. Provided the ball mill is constructed to hold pressure like an autoclave, the reaction pressure can range from one-tenth atmosphere or less to 100 atmospheres or more but, for ease in operation, atmospheric pressure is preferred.

For all of the synthetic procedures described, the reaction time is simply that required to carry the particular reaction to a satisfactory degree of completion. This period can range from an hour or less to ten days or more, depending upon the particular reaction conditions employed.

All the amine reactants listed above for the high-pressure process can likewise be employed successfully in the ball mill process. More generally, suitable amine reactants include all trialkyl amines having no chain branching nearer to the nitrogen atom than the gamma-carbon atom and containing up to about twelve carbon atoms per alkyl group. Also included are all dialkyl-N-aryl amines wherein the alkyl groups have no chain branching nearer to the nitrogen than the gammacarbon atom and contain up to about twelve carbon atoms per alkyl group, and wherein the aryl group is monocyclic and may contain simple alkyl substituents of from one to about eight carbon atoms provided said substituents are not positioned adjacent to the nitrogen atom.

Pyrolysis of amine complex

The pyrolysis temperature can vary from about 120° C. or below to the decomposition temperature of the beryllium hydride product. The preferred temperature range is from about 180 to 220° C. because, below 180°, a considerable amount of amine impurity is retained in the beryllium hydride product and because, above 220°, decomposition of beryllium hydride becomes rapid. In fact, it is undesirable to maintain the temperature as high as 220° C. for more than fifteen minutes, whereas it can be held at 200° C. for at least two hours without excessive decomposition.

The pressure in the pyrolysis chamber can vary from atmospheric (when a carrier gas is employed to sweep the amine from the reaction system) to $10^{-6}$ millimeters of mercury. Pressures in the range of from about 0.1 to 5 millimeters are preferred because pressures in this range are readily obtainable in both laboratory- and commercial-scale equipment.

The beryllium hydride product of the pyrolysis of the compounds of this invention is useful as a source of storable hydrogen, as a medium for the metal plating of substrates, as a source (by thermal decomposition) of pure metallic beryllium and as a component of jet and rocket fuels. The compounds of this invention are themselves useful in the metal plating of substrates and the preparation of pure metallic beryllium, and as reducing agents for such organic compounds as acids, esters, nitriles, ketones, aldehydes and olefins.

What is claimed is:

1. Process for the preparation of beryllium hydride of a high degree of purity which comprises heating, in an atmosphere inert with respect to reactants and products, and to a temperature sufficient to effect substantially complete dissociation thereof, a molecular complex of beryllium hydride with an amine, wherein the molar ratio of beryllium hydride to amine is 1:1, and wherein the amine is selected from the group consisting of trimethylamine, dimethylethylamine, methyldiethyl amine, triethyl amine, amines of the formula $$Me_2NR$$

wherein Me represents a methyl radical and R an alkyl radical containing from three to about twelve carbon atoms, N,N-dimethylbenzyl amine, N,N-dimethylcyclohexyl amine, N-methyl pyrrolidine, N-methyl piperidine and N-methyl morpholine, said inert atmosphere being a dry gas selected from the group consisting of nitrogen, helium, neon, argon, krypton, xenon and saturated aliphatic hydrocarbons, to produce a reaction product containing beryllium hydride and said amine, and separating said beryllium hydride from said reaction product.

2. Process for the purification of crude beryllium hydride which comprises converting said crude beryllium hydride to a beryllium hydride-amine molecular complex, purifying said complex, dissociating the purified complex by the process of claim 1 to produce a reaction product containing beryllium hydride and an amine and separating said beryllium hydride from said reaction product.

References Cited

J. Chem. Soc. (London), (1954), Coates et al. pp. 2526–2529.

The Chem. of Beryllium, vol. I, Everest, Elsevier Pub. Co., N.Y. (1964), QD 181 B4E9, pp. 82, 83 and 91–101.

J. Organometal. Chem., vol. 3, Peters, pp. 334–5 (1965).

Binary Metal Hydrides, Libowitz, W. A. Benjamin Inc., N.Y., 1965, pp. 12–22.

CARL D. QUARFORTH, Primary Examiner

R. L. TATE, Assistant Examiner

U.S. Cl. X.R.

423—645